Jan. 13, 1959 R. E. RENARD ET AL 2,868,373
DISCHARGE MECHANISM FOR CAN-TESTING MACHINE
Filed Feb. 13, 1956 3 Sheets-Sheet 3
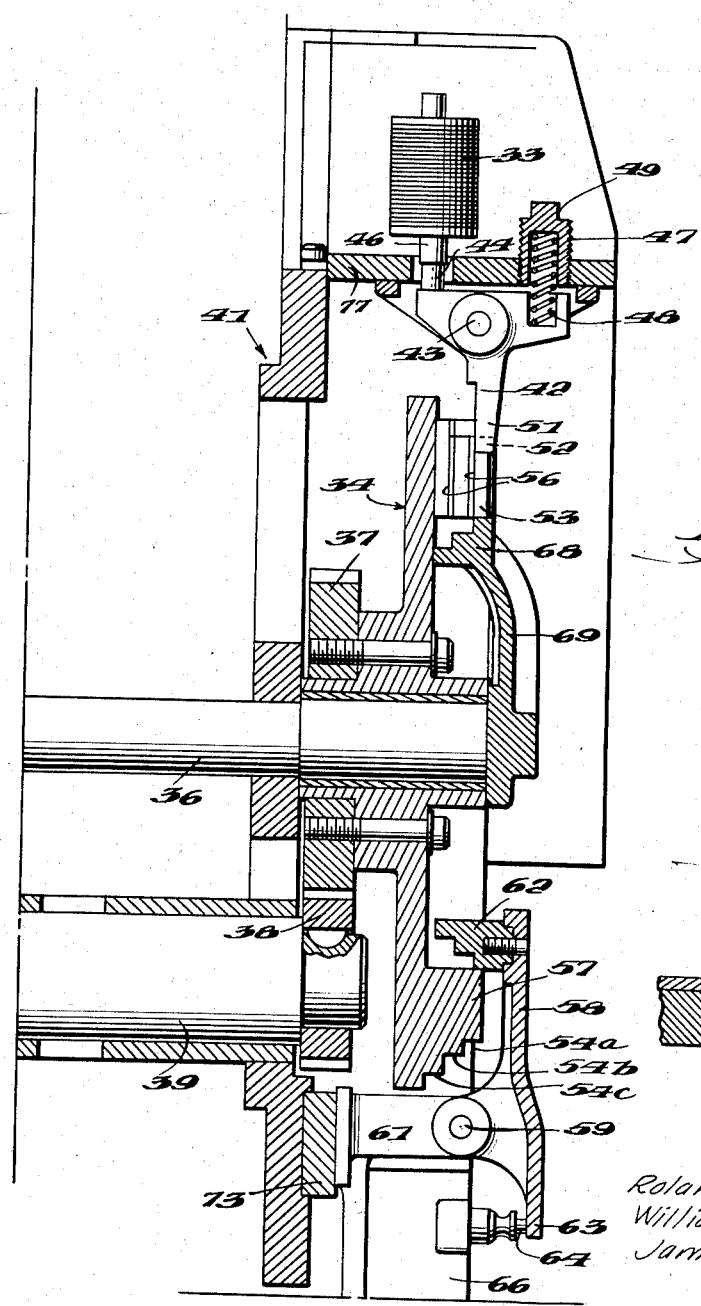
INVENTORS
Roland E. Renard
William R. Thorpe
James P. Davidson
BY
Julian Caplan
ATTORNEY ced Jan. 13, 1959

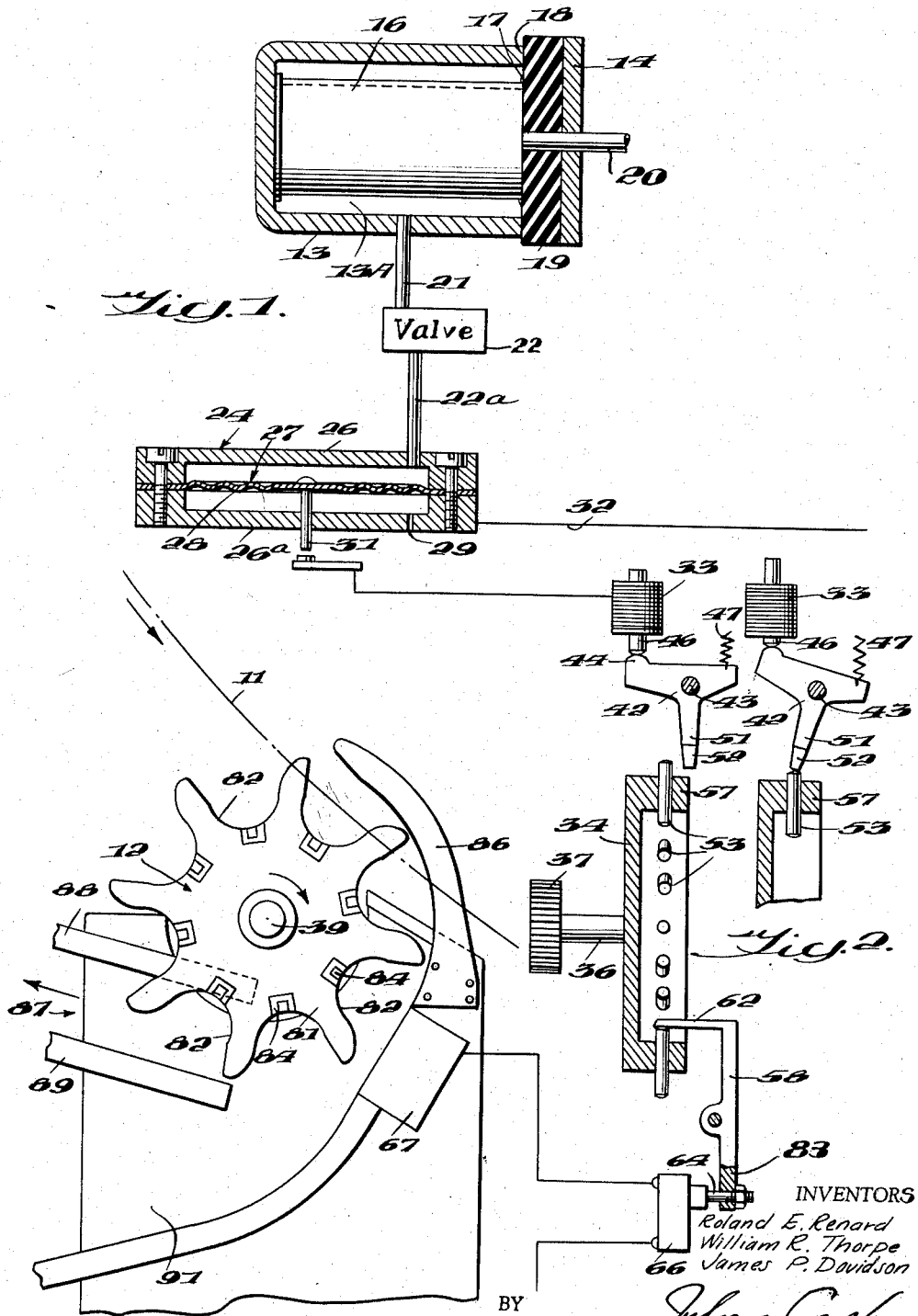

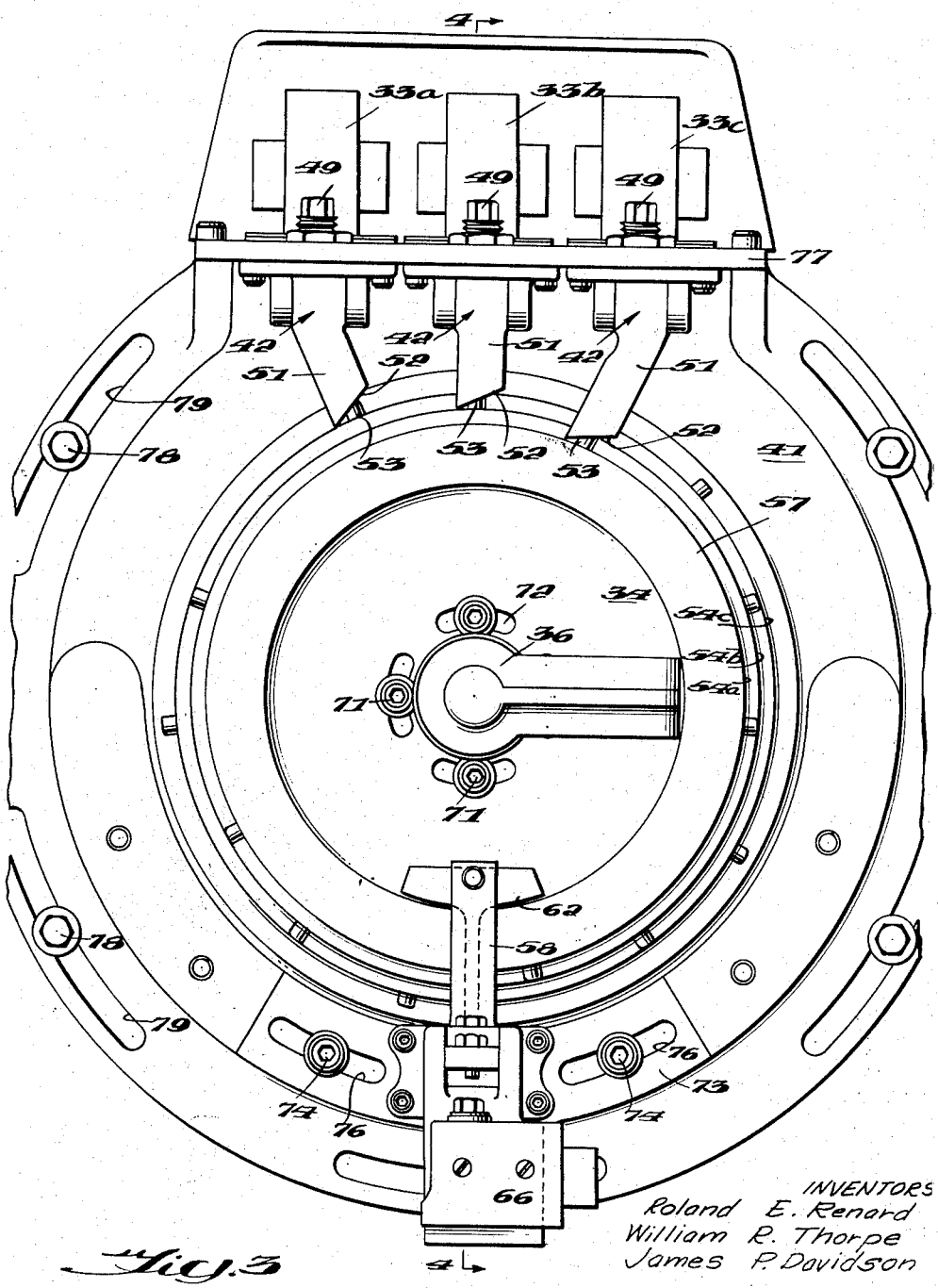

2,868,373

DISCHARGE MECHANISM FOR CAN-TESTING MACHINE

Roland E. Renard, Los Gatos, William R. Thorpe, San Jose, and James P. Davidson, Mountain View, Calif., assignors to National Can Corporation, Chicago, Ill., a corporation of Delaware Application February 13, 1956, Serial No. 564,900

2 Claims. (Cl. 209—74)

This invention relates to a new and improved discharge mechanism for can-tester machines. Customarily, after cans have been completed at the can manufacturing plant and before they are shipped to customers, the cans are tested for leaks. At this stage of their manufacture, the cylindrical can bodies have been formed and a can end has been seamed to one end, the opposite end being open.

There are several different types of can-testing machines currently used. The details of construction of such machines and the manner of their functioning forms no part of the present invention except as hereinafter appears. Essentially a can-tester machine comprises a very large diameter wheel revolving about a horizontal axis and carrying on its periphery a plurality of can-receiving pockets. The cans to be tested are inserted one at a time in the pockets and sealed therein by closures for the pockets which engage and seal against both the lip of the pocket and the open end of the can deposited therein. As each can is carried around the machine in its pocket, compressed air is applied to the interior of the can exclusive of the pocket. If there is no leak in the can, the volume of air within the chamber surrounding the can remains at atmospheric pressure. However, if there is a leak in the can, the pressure in this chamber rises to approximately the pressure of the air in the can. Pressure responsive means is provided to detect the rise in pressure in the defective can pocket and this detection is recorded in a memorizer which functions to store information and subsequently actuate a means to discard the leaky can after the can has been discharged from its pocket.

The present invention relates to an improved discharge mechanism which receives the cans as they are released from their pockets and segregates the defective cans.

One of the features and advantages of the present invention is the provision of an electromagnet adjacent the path of the cans as they are discharged from the tester machine and means to energize the magnet at the instant that a defective can is passing in proximity to the magnet so that the leaky can may be diverted from the path of normal cans. The present invention eliminates the use of swinging gates, fingers, suction devices and the like, which are conventionally employed as segregating means. All of such devices employ moving parts which find no counterpart in the present invention and which introduce elements of inaccuracy, likelihood of jamming, and retard the speed of operation.

Accordingly the present invention provides a discharge and segregating mechanism which is rapid and accurate in its operation and which reduces the number of moving parts, thereby reducing the likelihood of jamming the cans.

Another feature of the invention is the provision of a memorizer which records detection of a defective can and at the appropriate time energizes the electromagnet to divert the leaky can from the path of normal cans, which memorizer is simple in operation and construction.

Still another feature of the invention is the provision of a rotary discharge turret which receives cans discharged from the pockets of the can-tester wheel and carries normal cans around to a discharge chute, the turret being provided with permanent magnets in each of the pockets thereof of sufficient strength to hold normal cans in the pockets against centrifugal force and the attraction of gravity until the normal cans are mechanically stripped from the pockets. At the same time, the strength of the permanent magnets is not such as to prevent defective cans being diverted from the path of normal cans when the electromagnet heretofore mentioned is energized.

Other objects of the present invention will become apparent upon reading the following specification and referring to the accompanying drawings in which similar characters of reference represent corresponding parts in each of the several views.

In the drawings:

Fig. 1 is a schematic view showing the elements of the present invention;

Fig. 2 is a fragmentary view of a portion of the mechanism illustrated in Fig. 1 shown in a position of adjustment when a defective can is detected;

Fig. 3 is a side elevation of the memorizer wheel and associated mechanism;

Fig. 4 is a vertical sectional view taken substantially along the line 4—4 of Fig. 3; and Fig. 5 is a fragmentary end elevation, partly in section, of a portion of a discharge turret.

Referring now to Fig. 1, there is provided a can-tester wheel (not shown) of large diameter, the path of travel thereof being designated by dot-and-dash line 11 which intersects the path of travel of smaller diameter discharge turret 12. A plurality of can pockets 13 which are disposed with their axes parallel to the horizontal axis of rotation of the tester wheel is located on the periphery of the can-tester wheel. Dot-and-dash line 11 represents a portion of the path of travel of the axis of such pockets. The construction of pockets 13 and the means whereby the covers 14 therefor are opened and closed and cans are inserted therein and removed therefrom form no part of the present invention and are well understood in the art to which this invention pertains. Essentially, however, such pocket 13 comprises an open-ended, cylindrical, pneumatically sealed receptacle dimensioned to receive therein a can 16 to be tested, with the open end 17 of the can facing toward the open end 18 of the pocket 13. Each pocket 13 is provided with a cover 14 having on its inner surface a resilient gasket 19 which seals against end 18 of the pocket and also against the open edge 17 of the can, and accordingly seals the interior of the pocket from the atmosphere and the interior of the can both from the atmosphere and from the pocket. Compressed air is delivered to can 16 by means of a pipe 20, a suitable valve mechanism (not shown) being provided to initiate and discontinue delivery of compressed air at appropriate time intervals. A pipe 21 is attached to pocket 13 so that pressure within pocket chamber 13A is transmitted by pipe 21. If a normal or non-leaky can is disposed within pocket 13, the pressure within chamber 13A and hence within pipe 21 will remain substantially at atmospheric despite the pressure of the compressed air entering thru pipe 20 and existing in the can. However, when a defective can is deposited in pocket 13, the compressed air in the can leaks out to the chamber 13A and the increase in pressure is transmitted by pipe 21.

Pipe 21 leads to valve mechanism 22 (the details of which are not illustrated since they are well understood in this art) and is in communication with one of a plurality of pipes 22ª which terminate at one of a plurality of pressure-responsive detectors 24 each of which comprises a housing of two shallow halves 26 and 26ª having their open ends facing each other and engaging around their lips the edges of a metal diaphragm 27. Diaphragm 27 is formed with annular corrugations 28 so that it is particularly sensitive to pressure and deflects responsive to pressure differentials on its opposite surfaces. Pipe 22ª is connected to housing 26 on one side of diaphragm 27 and housing 26ª on the opposite side of the diaphragm is vented by means of vent 29. Pin 31 is fixed to diaphragm 27 and projects out of housing 26ª. As diaphragm 27 moves responsive to pressure in pipe 22ª, the movement is transmitted to pin 31. One lead 32 of an electrical system is connected to detector 24 and hence pin 31 comprises one element of a switch contact. The other element of the switch contact is positioned in proximity to the end of pin 31. Hence, when the pressure in pipe 22ª rises by reason of a leaky can being deposited in a pocket 13, pin 31 completes an electric circuit to one of a plurality of solenoids 33, the function of which hereinafter appears.

Memorizer wheel 34 is shown schematically in Fig. 1 and in greater detail in Figs. 3 and 4. The wheel revolves around shaft 36 and is fixed to gear 37 which meshes with pinion 38 on the shaft 39 of discharge turret 12. Surrounding wheel 34 is a frame 41. Although, as shown in Fig. 1, for the sake of simplicity, only a single solenoid 33 is illustrated, actually three solenoids 33ª, 33ᵇ and 33ᶜ mounted on frame 41 and three detectors 24 are employed, one being associated with each solenoid. Thus every third pocket 13 is pneumatically connected by valve 22 with a proper detector 24. This arrangement enables detection to be carried out for three times the length of time which would be possible if there were a single detector. In proximity to each solenoid 33 is a T-shaped trip lever 42 which is pivoted about pivot 43. Pin 44 projecting upwardly from one branch of trip-lever 42 contacts armature 46 of solenoid 33. Coil spring 47 which projects into recess 48 in the other arm of trip-lever 42 and which is carried in an adjustable spring retainer 49 threaded into frame 41 biases trip-lever 42 in a clockwise direction as viewed in Figs. 1 and 4. Thus when solenoid 33 is energized by a defective can being detected, armature 46 is retracted and trip-lever 42 is moved by thrust of spring 48 through a small arc. The lower leg 51 of trip-lever 42 is formed with a bevel 52 on its leading surface and engages and depresses one of a plurality of detents 53 carried by memorizer wheel 34.

Memorizer wheel 34 is formed with three steps, 54ª, 54ᵇ and 54ᶜ, as best shown in Fig. 4, and each of the steps is formed with a plurality of radially extending holes 56 slidably receiving detents 53 which comprise short, smooth pins. Detents 53 are angularly separated from one another. Each of the trip-levers 42 is positioned and dimensioned so that it is associated with only one of steps 54ª, 54ᵇ and 54ᶜ and engages only those detents in that particular step. Assuming, therefore, that a leaky can is deposited in a particular pocket 13 and that leg 51 of trip-lever 42 has swung to the left as viewed in Fig. 4, as memorizer wheel 34 revolves, the next detent 53 in the particular step with which the trip-lever is associated contacts beveled leading surface 52 of the trip lever and hence is depressed so that it is projected inwardly of the memorizer wheel, the opposite end projecting inwardly from the inside of flange 57.

Located on frame 41 approximately 180° removed from trip levers 42 is switch lever 58 pivoted by means of horizontal pivot 59 to bracket 61 on frame 41. The upper end of switch lever 58 has a three-stepped finger 62 attached thereto formed with steps corresponding to the steps 54ª, 54ᵇ and 54ᶜ on flange 57. In the event that any of detents 53 is depressed by action of one of trip levers 42, when it is carried around to bottom position, it contacts and moves finger 62 outwardly and pivots switch lever 58 outwardly. An extension 63 of switch lever 58 has a contact 64 which engages a microswitch 66 and microswitch 66 is connected into an electric circuit which energizes electromagnet 67.

In order to reset depressed detents 53, a three-stepped detent-resetting cam 68 is attached to frame 41 by arm 69 intermediate switch lever 58 and trip levers 42. Resetting cam 68 forces any depressed detents 53 into extended position prior to the time that they travel into proximity with trip levers 42.

Inasmuch as immediate discard of a defective can cannot be accomplished in that the cans are enclosed within pockets 13, it is necessary that a certain time interval elapse between the times that a defective can is detected and it is diverted from the normal cans, this time interval being necessary in order to remove the can from the testing pocket 13. Accordingly, the memorizer wheel 34 is employed to record the fact that a defective can has been tested and preserves the recordation until after the can has been discharged from its pocket 13. The time interval between detection of the leaky can and the instant that it passes electromagnet 67 is the same as the time interval between the times that detent 53 passes trip-lever 42 and switch lever 58.

In order to afford adjustability to the memorizer wheel, gear 37 is connected to memorizer wheel 34 by means of bolts 71 which pass through arcuate slots 72 in memorizer wheel 34, thereby permitting adjustment of timing. In addition, the segment 73 on which switch lever 58 is mounted is connected to frame 41 by means of bolts 74 which also pass through arcuate slots 76. In addition, sub-frame 77 on which solenoids 33 and trip levers 42 are mounted is attached to frame 41 by means of other bolts 78 passing through arcuate slots 79. The adjustable mounting of the various parts of the memorizer wheel affords considerable adjustability in the timing of the functions thereof.

The discharge turret 12 comprises a pair of spaced star wheels 81 formed with a plurality of pockets 82. Fastened to each of the pockets of star wheels 81 by means of a bracket 83 is a permanent horseshoe magnet 84 having a magnetic attraction sufficient to hold a can in pocket 82 until it is either stripped off or diverted from the pocket by the attraction of electromagnet 67 which has a greater force than permanent magnets 84. As cans are released from individual pockets 13 at the completion of the testing cycle, they are directed by means of strippers 86 into pockets 82 of star wheels 81 and carried around in a clockwise direction, as viewed in Fig. 1. In those instances where the cans are normal, the cans are carried around to good can chute 87 which comprises a top and bottom rail 88 and 89, top rail 88 stripping the cans out of their pockets against the force of magnets 84. Imperfect cans are attracted by electromagnet 67 so that they fall downward and into defective can chute 91 from where they are discarded.

Accordingly the instant invention provides an accurate leaky can detector 24 and a memorizer 34 which records the fact that a leaky can has been tested and retains the information until the leaky can has been discharged from the tester wheel pocket 13 in which it was tested and transferred to the discharge turret 12, and a segregating device which comprises an electromagnet 67 and eliminates the necessity of using gates, clamping fingers, pneumatic attraction and various other instrumentalities employed in prior testing discharge mechanisms.

Although the foregoing invention has been described in some detail by way of illustration and example for purposes of clarity of understanding, it is understood that certain changes and modifications may be practiced within the spirit of the invention and scope of the appended claims.

What is claimed is:

1. A can-testing machine comprising guide means establishing a path of travel for normal cans, defective can diverting means to divert defective cans from said path of travel, at least two defective can detection means each operable to detect a defect in a can and arranged to test cans in sequence, a plurality of solenoids corresponding in number to said detection means and each connected to one of said detection means and energized by its respective detection means upon detection of a defective can, a memorizer wheel having a periphery formed with a plurality of steps corresponding in number to said detection means, each said step being provided with a plurality of radially slidable detents, a trip lever for each said step arranged to be tripped by one of said solenoids, each said trip lever being movable to move any of the detents in the step with which said trip lever is associated from a first position to a second position, a switch lever positioned adjacent said memorizer wheel and positioned to be moved by a detent in second position in any of said steps, and a switch positioned to be closed when said switch lever is moved and operable to energize said diverting means.

2. A can-testing mechanism according to claim 1 in which said guide means includes a rotary turret having pockets and at least one magnet in each said pocket and in which said diverting means includes an electromagnet of sufficient magnetic strength to divert defective cans from said pockets against the attraction of said permanent magnets.

References Cited in the file of this patent
UNITED STATES PATENTS

| | | |
|---|---|---|
| 1,617,663 | Ayers | Feb. 15, 1927 |
| 2,013,402 | Cameron | Sept. 3, 1935 |
| 2,132,447 | Stout | Oct. 11, 1938 |
| 2,217,342 | Ladrach | Oct. 8, 1940 |
| 2,312,357 | Odquist et al. | Mar. 2, 1943 |
| 2,687,202 | Nordquist et al. | Aug. 24, 1954 |
| 2,696,107 | Blaing-Leisk | Dec. 7, 1954 |
| 2,700,465 | Pechy et al. | Jan. 25, 1955 |
| 2,743,001 | Nordquist | Apr. 24, 1956 |
| 2,748,937 | Casler et al. | June 5, 1956 |
| 2,821,300 | Bofinger et al. | Jan. 28, 1958 |